3 Sheets—Sheet 1.

C. A. STOCKSTROM.

Assignor of one-half to L. STOCKSTROM.

GASOLINE STOVE ATTACHMENT.

No. 11,007. Reissued June 11, 1889.

Inventor,
C. A. Stockstrom
By Knight Bros
Atty's

Attest:
H. B. Knight
E. Arthur

N. PETERS, Photo-Lithographer, Washington, D. C.

C. A. STOCKSTROM.

Assignor of one-half to L. STOCKSTROM.

GASOLINE STOVE ATTACHMENT.

No. 11,007. Reissued June 11, 1889.

Attest;
H. S. Knight
E. Arthur.

Inventor;
C. A. Stockstrom
By Knight Bros
Att'ys

N. PETERS, Photo-Lithographer, Washington, D. C.

C. A. STOCKSTROM.

Assignor of one-half to L. STOCKSTROM.

GASOLINE STOVE ATTACHMENT.

No. 11,007. Reissued June 11. 1889.

Attest:
H. C. Knight
E. Arthur

Inventor:
C. A. Stockstrom
By Knight Bros
attys

N. PETERS, Photo-Lithographer, Washington, D. C.

UNITED STATES PATENT OFFICE.

CHARLES A. STOCKSTROM, OF ST. LOUIS, MISSOURI, ASSIGNOR OF ONE-HALF TO LOUIS STOCKSTROM, OF SAME PLACE.

GASOLINE-STOVE ATTACHMENT.

SPECIFICATION forming part of Reissued Letters Patent No. 11,007, dated June 11, 1889.

Original No. 350,094, dated September 28, 1886. Application for reissue filed May 23, 1887. Serial No. 239,141.

*To all whom it may concern:*

Be it known that I, CHARLES A. STOCKSTROM, of the city of St. Louis, in the State of Missouri, have invented a certain new and useful Improvement in Gasoline-Stove Attachments, of which the following is a full, clear, and exact description, reference being had to the accompanying drawings, forming part of this specification, and in which—

Figure 1:
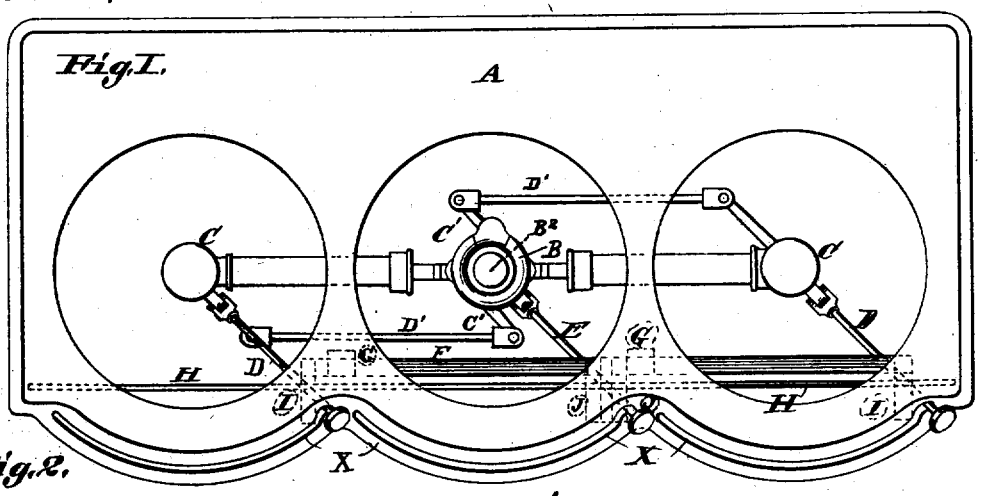
Figure 2:
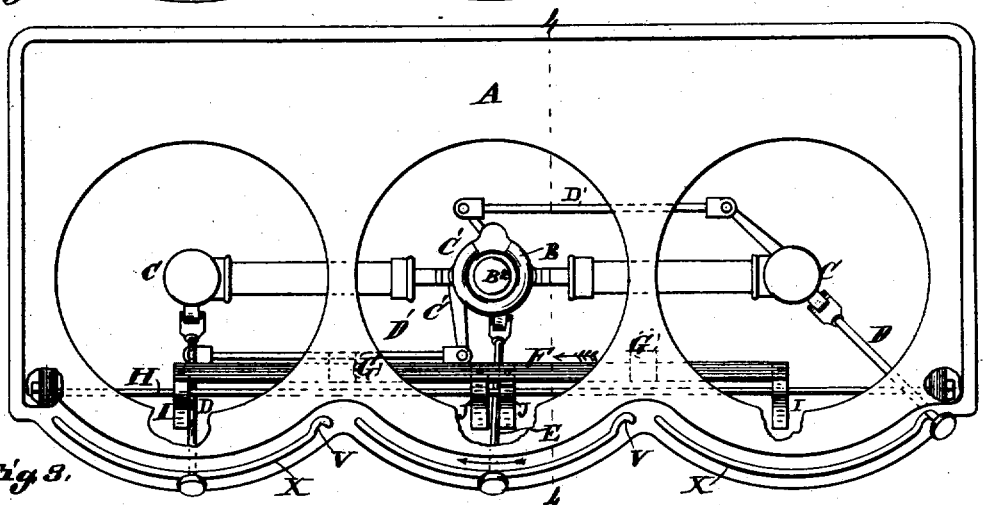
Figure 3:
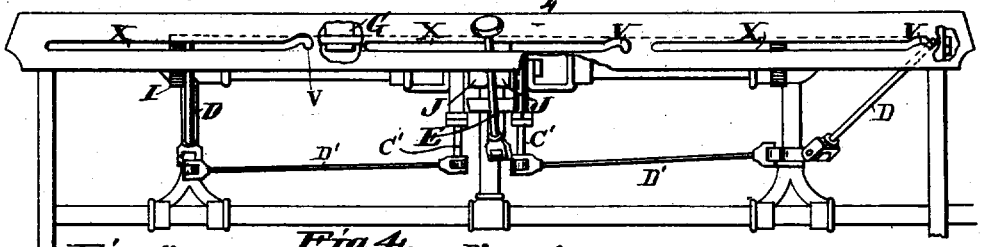
Figure 5:
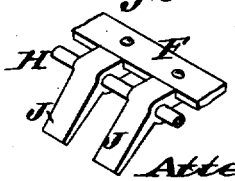
Figure 4:
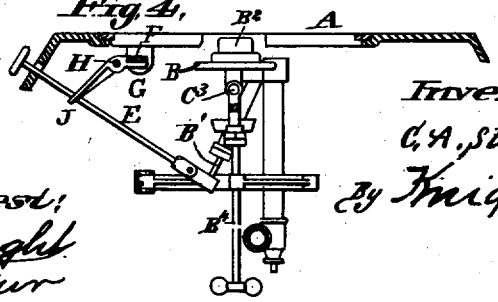
Figure 6:
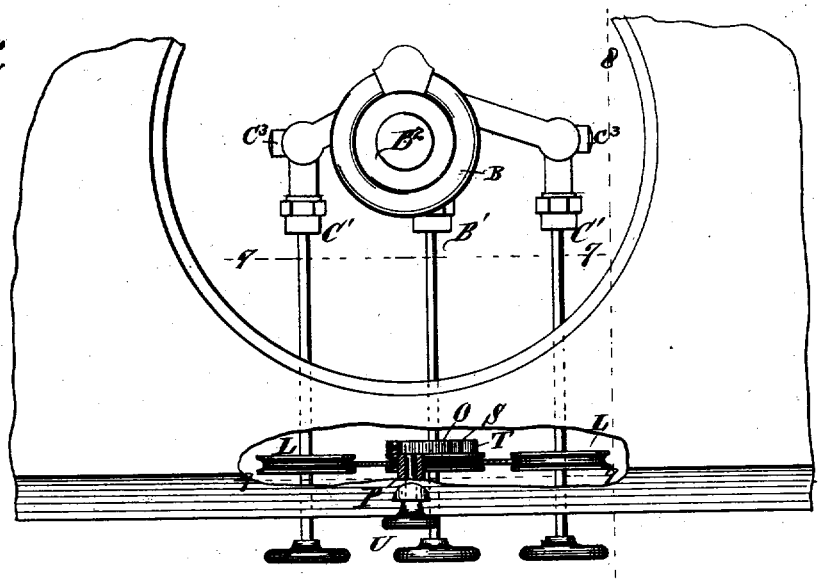
Figure 7:
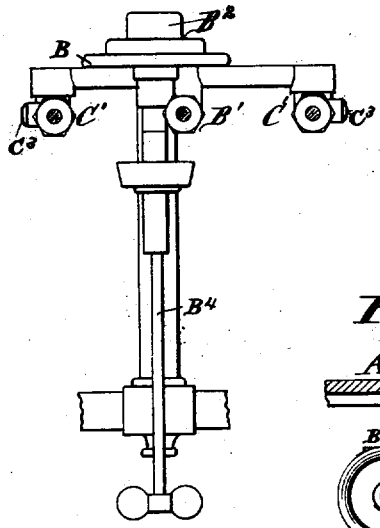
Figure 8:
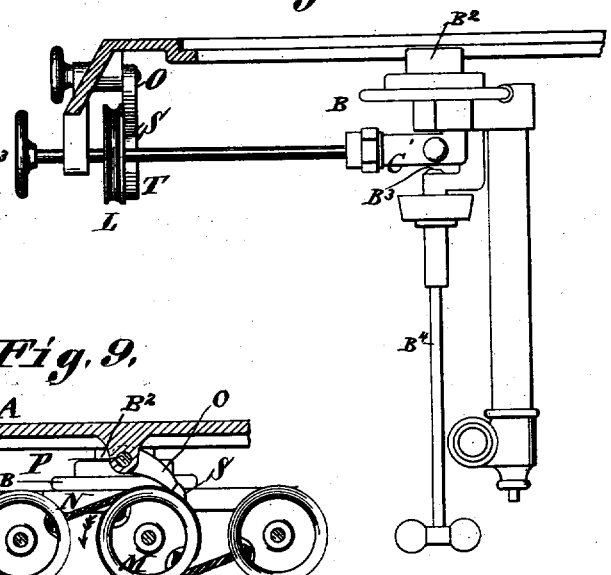
Figure 9:
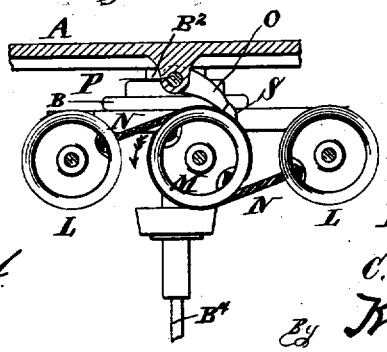
Figure 10:
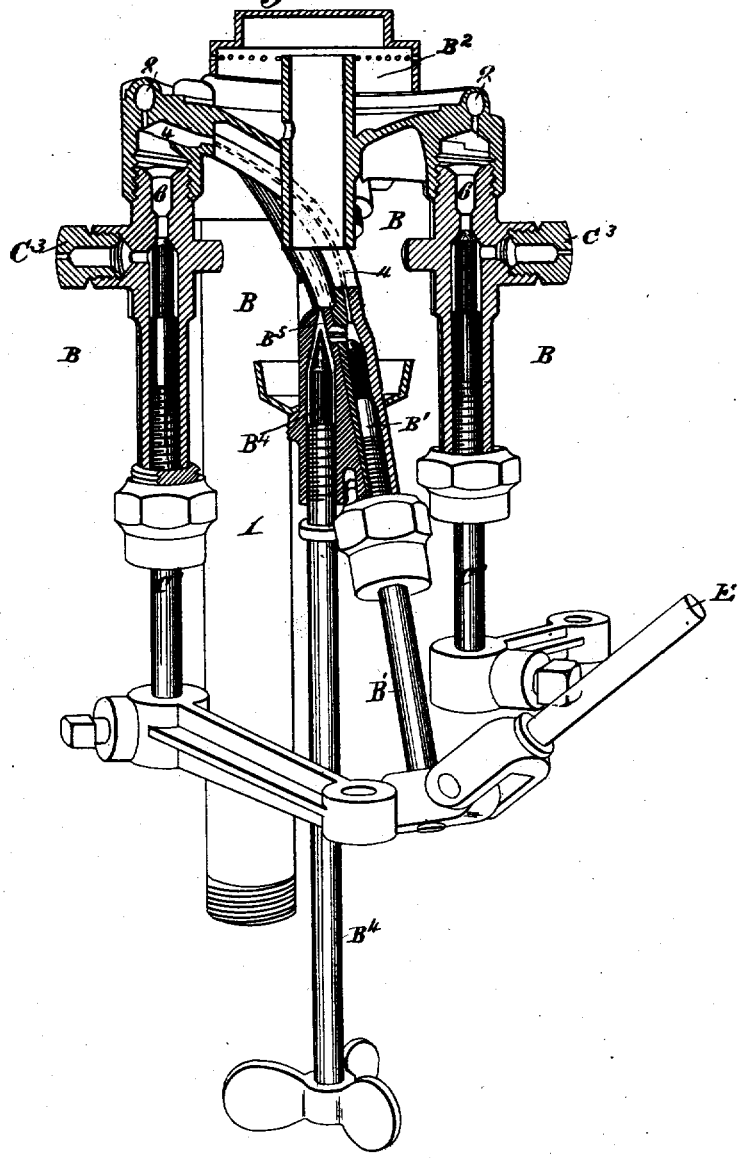

Figure 1 is a top view of a gasoline-stove with my improvement applied and all the valves of the burners closed. Fig. 2 is a similar view showing two of the valves open. Fig. 3 is a front view of Fig. 2. Fig. 4 is a vertical transverse section taken on line 4 4, Fig. 2. Fig. 5 is a detail perspective view. Fig. 6 is an enlarged detail top view illustrating a modification. Fig. 7 is a vertical section taken on line 7 7, Fig. 6. Fig. 8 is a similar view taken on line 8 8, Fig. 6; and Fig. 9 is a similar view taken on line 9 9, Fig. 6. Fig. 10 is an elevation, partly in section, of a form of generator to which my improvement may be applied.

My invention relates to an attachment to be used on a gasoline-stove having a generator and one or more side burners supplied with vapor from the generator; and my invention consists in features of novelty hereinafter fully described, and pointed out in the claims.

Referring to the drawings, A represents the top plate of a gasoline-stove; B, a generator, having a burner $B^2$, and C one or more side burners, supplied from the generator in the usual manner—as, for instance, the generator shown in Fig. 10. Here the supply of oil from the reservoir is conveyed through the supply-pipe 1 to the circular passage 2, extending around the edge of the generator B, where it is vaporized, and from whence it is conveyed by a passage 4 to the main valve B′, which, being opened, the vapor flowing out is ignited at the generator-burner. As soon as the vaporization of the oil takes place in the generator the side burners, also communicating with the passage 2 by means of passages 6 6, are now ready to receive their supply of vapor, which is allowed to flow thereto by the opening of the valves C′ C′. I have shown in my present application two side burners C; but one or more than two may be used. The valve C′, located at the generator of each side burner, is provided with an operating-lever D, to which it is connected by a rod D′, and the valve B′ of the generator is provided with an operating-lever E. $B^4$ is a cleaning needle or plug for the jet-hole $B^3$ of the main valve. The needle or plug $B^4$ is normally open. $C^3$ are the jet-orifices of the side-burner valves.

F represents a slide-plate secured to the top A of the stove by guide-brackets G, which permit it to be moved longitudinally.

H represents a rod or bar secured to the top of the stove. This rod passes through arms or projections J and I, which are secured to the slide-plate F, the rod acting as a guide to the arms and as a support to hold them firm and rigid. The arms J are close together, as shown in Fig. 2, and between them fits the lever E of the main valve. They could be made in one piece, slotted to receive the lever. The arms I project on one side of the side-burner levers D, as shown in Fig. 2. It will thus be seen that the movement of the lever E in the direction shown by the arrow, Fig. 2, to open the main valve, will move the slide-plate F in the direction indicated by the arrow, this having no effect upon the side-burner valves, either one or both of which is free to be opened, if desired. Now, supposing one or both of them to be opened before the main valve is closed, it will be understood that it or they can be closed again without operating or affecting the main valve; but any attempt to close the main valve will close the side-burner valves, owing to the arms I being forced against the levers D, so that it is thus impossible to close the main valve without at the same time closing the side-burner valve or valves. As in devices heretofore constructed, the side burners getting their supply of vapor from the generator, it will be apparent that if the main valve is shut off, and consequently does not permit the escape of any more vapor while one or more side burners are still burning, gasoline instead of vapor will flow from the side-burner valves as soon as the generator has cooled down sufficiently, and cause damage. Another advantage of the present arrangement is that in case of the generator-burner and one or more side burners being lighted, but not being at full flame, neither of the side-burner valves can be opened any farther than the main valve, without at the same time opening the latter to the same extent, thereby insuring an increased production of vapor at the generator to be used by the increased side-burner flame. I have shown notches V at the ends of the slots X, in which the levers controlling the valves travel; but this is not any essential part of my present invention. As long as the main-valve lever is locked by being pressed into this notch, neither of the side-burner valves can be opened.

In the modification shown in Figs. 6, 7, 8, and 9 the valve-stems that open the supply of vapor to the supply pipe or pipes of the the side burner or burners C are connected to the stem of the main valve that cuts off the supply of vapor to the generator-burner by pulleys or wheels L and M and cords or chains N. By this arrangement, when the main valve is turned in the direction indicated by the arrows, Fig. 9, to open it, it simply loosens the cords or chains N, as will be readily understood, and does not operate the side-burner valves, but leaves them free to be opened, if desired; but should they be opened, the closing of the main valve will close them. In this modification I have shown a dog or pawl pivoted to the top A of the stove by a short shaft P, and engaging at its lower end with ratchet-teeth S on a disk T, secured to the main-valve stem. The object of this is to prevent any of the valve-stems being opened accidentally or by children, it being impossible to open it or them without first raising the pawl, which may be done by means of a hand-wheel U on the shaft P. This pawl answers the same purpose as the notches V in my preferred form.

I claim as my invention—

1. The combination of a gasoline-stove frame, a generator, a side burner having a pipe into which vapor passes from the generator, a main valve controlling the supply of gasoline to the generator, a valve controlling the flow of vapor to the side burner, a lever or its equivalent operating the generator-valve, and a connection between the generator and side-burner valves, permitting the opening of the main or generator valve independently, but preventing the closure thereof while the side-burner valve remains open, as explained.

2. The combination of a gasoline-stove frame, a generator, a side burner having a pipe into which vapor enters from said generator, a main valve controlling the supply of vapor to the generator-burner, a valve controlling the flow of vapor to the side burner, and levers or their equivalents connected to said valves, in combination with a lock and a movable device engaging the main-burner-valve lever or its equivalent, whereby when the main valve is closed the main-burner-valve lever or its equivalent is held in position by the lock, substantially as and for the purpose set forth.

3. The combination of a gasoline-stove frame, a generator having a jet-orifice, a side burner having a pipe into which the vapor enters from said jet-orifice, a main valve controlling the supply of vapor to the generator-burner, a valve controlling the flow of vapor to the side burner, levers or their equivalents connected with said valves, and a device connected to the main-valve lever and engaging the same upon one side, whereby the side-burner valve will be closed when the main valve is closed and the main valve opened without opening the side-burner valve.

4. The combination of a gasoline-stove frame, a generator having a jet-orifice, a side burner having a pipe into which the vapor enters from said jet-orifice, a main valve controlling the supply of vapor to the generator-burner, a valve controlling the flow of vapor to the side burner, levers or their equivalents connected with said valves, a slide-plate having guides, and arms or projections on the slide-plate with which the valve-levers engage.

5. The combination of a gasoline-stove frame, a generator having a jet-orifice, a side burner having a pipe into which the vapor enters from said jet-orifice, a main valve controlling the supply of vapor to the generator-burner, a valve controlling the flow of vapor to the side burner, levers or their equivalents connected with said valves, the sliding plate having arms or projections engaged by the valve-levers, and a guide-rod passing through the arms or projections, substantially as and for the purpose set forth.

6. The combination of a gasoline-stove frame, a generator having a jet-orifice, a side burner having a pipe into which the vapor enters from said jet-orifice, a main valve controlling the supply of vapor to the generator-burner, a valve controlling the flow of vapor to the side burner, levers or their equivalents connected with said valves, the sliding plate having arms or projections engaged by the valve-levers, guide-brackets secured to the frame, and a guide-rod passing through the arms, substantially as and for the purpose set forth.

7. The combination of a gasoline-stove frame, a generator having a jet-orifice, a side burner having a pipe into which the vapor enters from said jet-orifice, a main valve controlling the supply of vapor to the generator-burner, valve controlling the flow of vapor to the side burner, levers or their equivalents connected with all of said valves, a sliding plate having guides, lugs J J, one on each side of the main-valve lever, and lugs I, engaging the side-burner-valve levers, substantially as and for the purpose set forth.

CHAS. A. STOCKSTROM.

In presence of—
JOS. WAHLE,
EDW. S. KNIGHT.